US012281775B2

(12) United States Patent
Kreipe et al.

(10) Patent No.: US 12,281,775 B2
(45) Date of Patent: Apr. 22, 2025

(54) LIGHTING DEVICE FOR A MOTOR VEHICLE

(71) Applicant: Volkswagen Aktiengesellschaft, Wolfsburg (DE)

(72) Inventors: Bernhard Kreipe, Hannover (DE); Christian Studeny, Schoeppenstedt (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 18/639,580

(22) Filed: Apr. 18, 2024

(65) Prior Publication Data

US 2024/0263757 A1 Aug. 8, 2024

Related U.S. Application Data

(63) Continuation of application No. PCT/EP2022/078697, filed on Oct. 14, 2022.

(30) Foreign Application Priority Data

Oct. 18, 2021 (EP) .................................... 21203055

(51) Int. Cl.
*F21S 43/239* (2018.01)
*F21S 43/235* (2018.01)
(Continued)

(52) U.S. Cl.
CPC ........... *F21S 43/239* (2018.01); *F21S 43/237* (2018.01); *F21S 43/249* (2018.01); *F21S 43/252* (2024.05)

(58) Field of Classification Search
CPC ...... F21S 43/239; F21S 43/237; F21S 43/249; F21S 43/252
See application file for complete search history.

(56) References Cited

U.S. PATENT DOCUMENTS

2006/0104076 A1* 5/2006 Erber ...................... F21S 43/14 362/520
2015/0330593 A1 11/2015 Larsen et al.
(Continued)

FOREIGN PATENT DOCUMENTS

CN 110469817 A 11/2019
CN 211780822 U 10/2020
(Continued)

OTHER PUBLICATIONS

International Search Report dated Dec. 9, 2022 in corresponding application PCT/EP2022/078697.

*Primary Examiner* — Christopher E Dunay
(74) *Attorney, Agent, or Firm* — Muncy, Geissler, Olds & Lowe, P.C.

(57) ABSTRACT

A lighting device for a motor vehicle, having at least one light guide, which is formed planar, and having at least one illuminant. Light rays from the illuminant can be coupled or are coupled into the light guide via a light incoupling surface assigned to the light guide. Incoupled light rays are deflected via at least one light outcoupling structure of the light guide in the direction of at least one light outcoupling surface of the light guide and are again outcoupled from the light guide via the light outcoupling surface. The invention proposes that a rear surface of the light guide, which surface is opposite to the light outcoupling surface, is provided at least over a majority of its planar extent with a facet-like surface structure, which forms the light outcoupling structure of the light guide and formed of a plurality of irregularly formed facet surfaces.

12 Claims, 4 Drawing Sheets

(51) Int. Cl.

| | |
|---|---|
| ***F21S 43/237*** | (2018.01) |
| ***F21S 43/249*** | (2018.01) |

(56) References Cited

U.S. PATENT DOCUMENTS

| | | | | |
|---|---|---|---|---|
| 2020/0083401 | A1 | 3/2020 | O'Brien et al. | |
| 2020/0300434 | A1* | 9/2020 | Gloss | F21S 43/14 |
| 2021/0301994 | A1* | 9/2021 | Juhanak | F21S 43/239 |
| 2022/0128204 | A1* | 4/2022 | Bernard | F21V 5/04 |
| 2023/0003360 | A1* | 1/2023 | Studeny | F21S 43/14 |
| 2023/0408054 | A1* | 12/2023 | Muegge | F21S 43/14 |
| 2024/0093853 | A1* | 3/2024 | Mahel | F21S 43/315 |

FOREIGN PATENT DOCUMENTS

| | | | |
|---|---|---|---|
| DE | 202008015402 | U1 | 2/2009 |
| DE | 102010018031 | A1 | 10/2011 |
| DE | 102014218540 | A1 | 3/2016 |
| DE | 102015114175 | A1 | 3/2017 |
| DE | 202020104697 | U1 | 9/2020 |
| DE | 102020201648 | A1 | 8/2021 |
| EP | 2354637 | A2 | 8/2011 |
| JP | 2020181671 | A | 11/2020 |
| WO | WO2014105470 | A1 | 7/2014 |
| WO | WO2019230319 | A1 | 12/2019 |

* cited by examiner

LIGHTING DEVICE FOR A MOTOR VEHICLE

This nonprovisional application is a continuation of International Application No. PCT/EP2022/078697, which was filed on Oct. 14, 2022, and which claims priority to European Patent Application No. 21203055.5, which was filed in Europe on Oct. 18, 2021, and which are both herein incorporated by reference.

BACKGROUND OF THE INVENTION

Field of the Invention

The present invention relates to a lighting device for a motor vehicle.

Description of the Background Art

A lighting device of this kind is described in DE 10 2020 201 648 A1, which is incorporated herein by reference. In the lighting device disclosed therein, light from an illuminant can be coupled into a planar light guide via a light incoupling surface at the edge. Incoupled light rays can emerge outwards in a light emission direction of the lighting device via a light exit surface surrounded by side surfaces of the planar light guide. A rear surface, opposite the light exit surface, is provided with indentations which form a light outcoupling structure of the light guide and which, in a view of the lighting device opposite to its light emission direction, form a pattern, a logo, a symbol, a number, and/or at least one letter.

DE 10 2014 218 540 A1, which is incorporated herein by reference, discloses a lighting device with a reflector whose reflector surface has a plurality of reflective facet areas. A light function with a sparkle effect can be achieved by sequential control of light sources assigned to the reflector.

Finally, DE 20 2008 015 402 U1 describes an optical light scattering unit having a transparent scattering body and at least one light source whose emitted light is coupled into the scattering body at the edge and scattered upon its passage at the inhomogeneities present in the interior. The inhomogeneities or scattering points inside the scattering body are introduced in the course of internal processing, which is carried out with the aid of a laser.

SUMMARY OF THE INVENTION

It is therefore an object of the present invention to provide a lighting device for a motor vehicle with which a light function with a sparkle effect can be generated in a compact manner.

In an example, the invention is based on a lighting device for a motor vehicle, having at least one light guide, which is formed planar. The lighting device has at least one illuminant, wherein light rays from the illuminant can be or are coupled into the light guide via a light incoupling surface assigned to the light guide. Incoupled light rays can be deflected or are deflected via at least one light outcoupling structure of the light guide in the direction of at least one light outcoupling surface of the light guide. The deflected light rays can be or are outcoupled again from the light guide via the light outcoupling surface.

As mentioned, the light guide can be formed planar. Planar in the context of the invention is intended to mean that a component has a planar extent which runs in two mutually perpendicular directions and is several times greater in each direction than a thickness of the component.

A rear surface of the light guide, which surface is opposite the light outcoupling surface, can be provided at least over a majority of its planar extent with a facet-like surface structure, which forms the light outcoupling structure of the light guide and formed of a plurality of irregularly formed facet surfaces.

Within the context of the present invention, facet surfaces can be understood to be, in particular, adjacent surfaces of the light outcoupling structure of the light guide, which deflect the direction of incoupled light rays differently. The deflection at the transition from one facet surface to another facet surface, in particular to a neighboring facet surface, is discontinuous. The direction of a light ray is therefore deflected completely differently by neighboring facet surfaces.

In particular, the surface normals of adjacent facet surfaces can be oriented differently, as a result of which a discontinuous deflection of the direction of the incoupled light rays can be easily achieved.

In this way, the basic prerequisite is created that a sparkle effect can be produced with the lighting device for a moving observer of the lighting device. Due to the large number of irregularly formed facet surfaces, when the viewer moves, light rays are reflected towards the viewer from individual facet surfaces sequentially and unordered, depending on the viewing position.

With the simultaneous planar design of the light guide, an extremely compact lighting device can also be provided.

In order to intensify the achievable sparkle effect, it is proposed according to a refinement that the facet-like surface structure is a macrostructuring. In other words, the surface structure formed of the facet surfaces is visible to the naked eye. Each of the facet surfaces has edges or boundary lines delimiting it, which have a longitudinal extent of preferably more than 1 mm, particularly preferably in a range from about 1 mm to about 10 mm.

Each of the facet surfaces also can have a microstructuring. Like macrostructuring, microstructuring is also used for outcoupling light and can, for example, preferably formed of triangular structures when viewed in cross section. Other geometries for light outcoupling are also conceivable.

Advantageously, the microstructuring has a periodicity in at least one spatial direction in a range from about 50 μm to about 500 μm, particularly preferably in a range of about 100 μm. In other words, this means that a certain microstructure as a component of the microstructuring is repeated periodically in the spatial direction at an interval of about 50 μm to about 500 μm. For example, therefore, if the microstructuring has a large number of sawtooth-like microstructures, a sawtooth-like microstructure is repeated within the microstructuring in the said distance range. With such an order of magnitude of the microstructuring of each facet surface, on the one hand, a very intensive sparkle effect can be produced, and, on the other hand, a mechanical insertion into a tool (for example, injection molding tool), for example, by milling, is also possible in a cost-effective and reliable manner.

Further, there can be a plurality of illuminants and at least one control unit for controlling the illuminants, wherein the illuminants can be controlled independently of one another, and wherein the illuminants can be controlled and are arranged relative to the positions and/or orientations of the facet surfaces in such a way that at least one light function with a perceptible sparkle can be produced in a specific viewing position by the light rays emitted by the illuminants and deflected at the light outcoupling structure.

A sparkle effect can therefore be produced by this refinement even when a viewer of the lighting device remains in his viewing position.

The light guide can be formed flat. In other words, the cross section of the light guide is therefore not bent in one spatial direction. This makes it possible to design the lighting device particularly cost-effectively because such a light guide is easy to manufacture. In addition, this also facilitates a fan-like arrangement of multiple light guides in the lighting device, by which a 3D effect can be achieved.

The front light outcoupling surface of the light guide can be provided with patterns or coatings to achieve additional lighting effects.

At least one second light guide can be provided, into which light rays from at least one second illuminant can be coupled or are coupled via a light incoupling surface assigned to the second light guide. Incoupled light rays can be outcoupled or are outcoupled again via at least one light outcoupling surface of the second light guide. The illuminants facing the light incoupling surfaces of the two light guides are arranged on a common circuit board and the light outcoupling surfaces of the light guides point at least in sections in the same light emission direction.

Different light functions can be realized effectively and in a space-saving manner by such a refinement.

The common circuit board therefore can carry all the illuminants whose light is coupled into the light guides and the light outcoupling surfaces of the light guides are oriented at least in sections in such a way that their imaginary surface normals point in the same light emission direction.

The second light guide can also be formed planar, wherein one edge side of the light guide serves as its light incoupling surface and another edge side of the light guide serves as its light outcoupling surface. In this way, a very high luminance can be achieved by the second light guide. In this way, the outcoupling surface is formed like a strip or line. Furthermore, a very unusual appearance of the lighting device, especially when the illuminants are activated, can be realized by this design.

The second light guide can be designed rod-shaped. In so doing, one end face of the light guide serves as its light incoupling surface and another end face of the light guide serves as its light outcoupling surface. The rod-like light guide can also be straight or curved.

Thus, a very high luminance can be achieved by the second light guide, so that all conceivable light functions can be effectively implemented with the lighting device despite the inefficient, planar first light guide for some light functions.

At least one light guide can be oriented with its planar extent substantially perpendicular to a planar extent of the circuit board and the second light guide can be oriented substantially parallel to the planar extent of the circuit board. In this case, the second light guide can have a deflection slope arranged in the area of its light incoupling surface.

In this way, a perfect deflection of light rays, coupled into the light incoupling surface of the second light guide, to the light outcoupling surface of the second light guide can be ensured.

Finally, the present invention is also intended to provide protection for a motor vehicle which is equipped with at least one lighting device of the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

Figure 4:
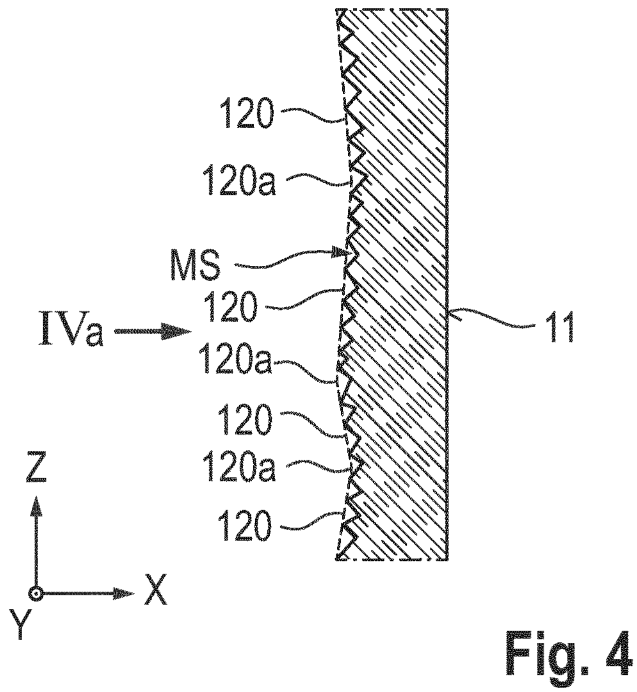
FIG. 4 is a sectional view according to sectional line IV through the detail section D from FIG. 3.
Figure 5:
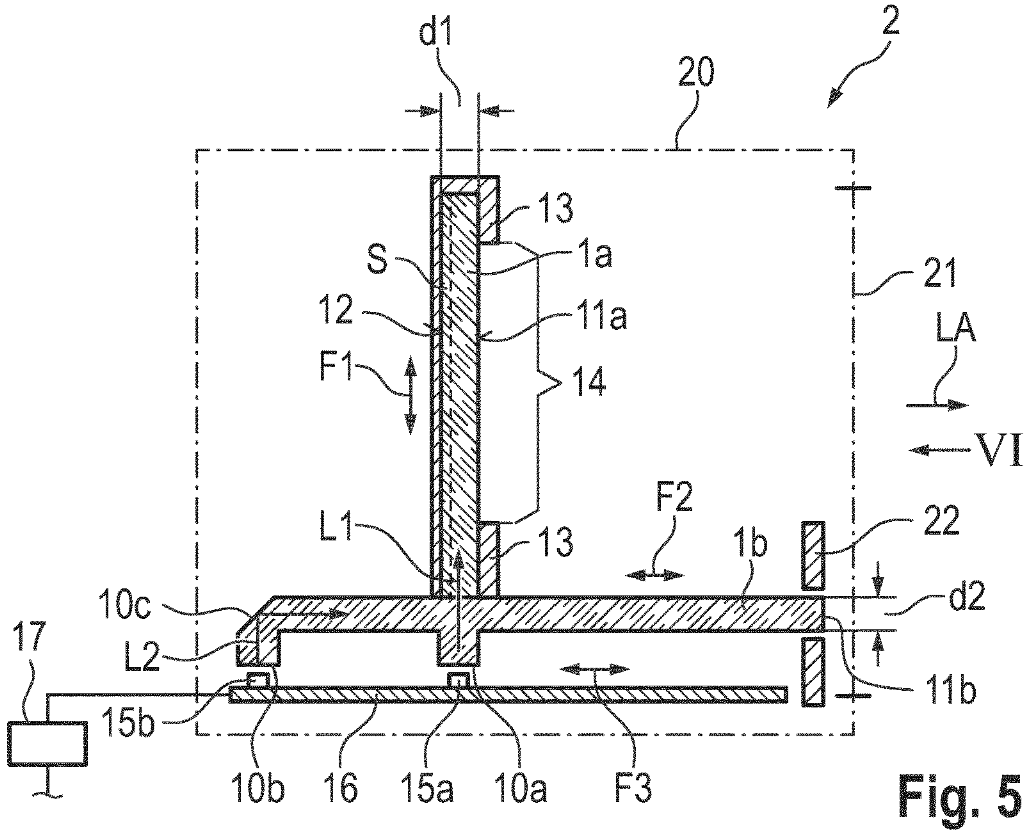
Figure 6:
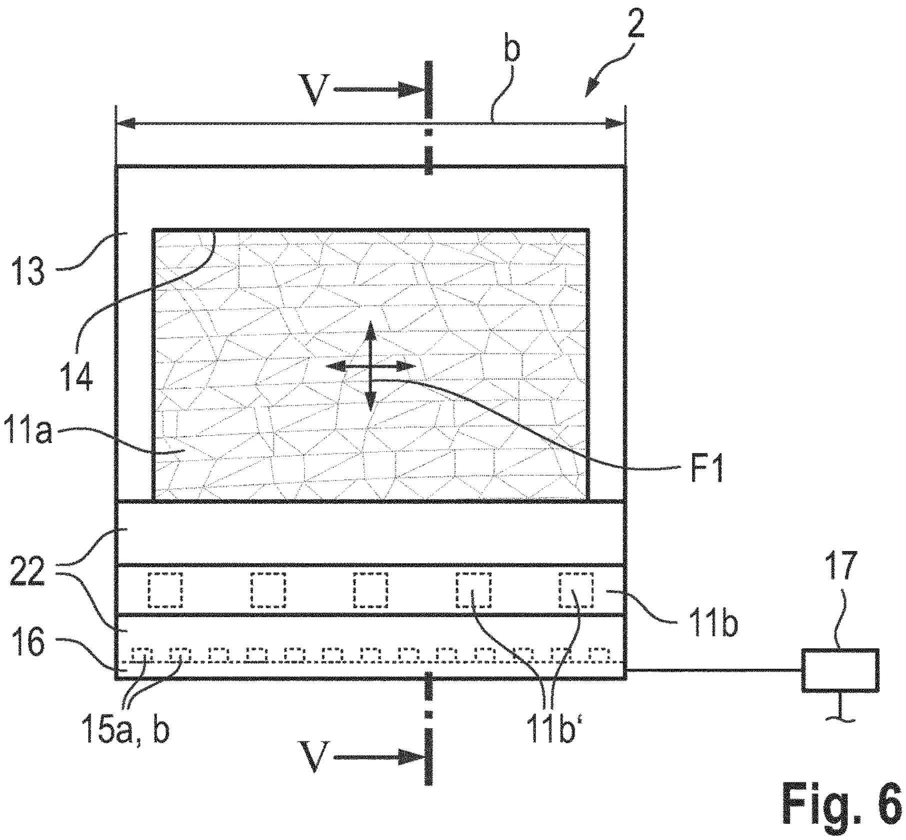
Figure 7:
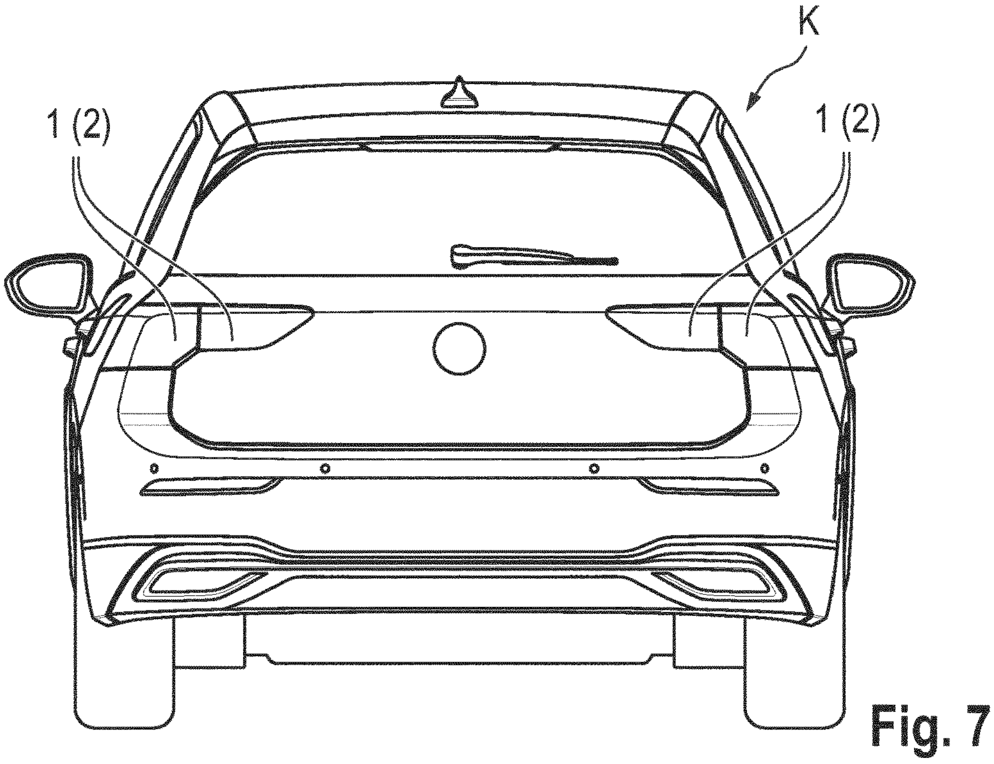

FIG. **4*a* is a view of the detail section D according to view IVa from FIG. 4**;

FIG. 5 is a sectional view of a lighting device according to an example;

FIG. 6 is a depiction of the lighting device against a light emission direction according to view VI from FIG. 5; and FIG. 7 is the rear view of a motor vehicle with lighting devices of the invention.

DETAILED DESCRIPTION

A lighting device 1 is shown in these figures, which has a housing 18 (indicated by a dashed line) which is provided with an opening, closed by a lens 19, in the light emission direction LA.

A light guide **1*a* is accommodated in housing 18. Light guide 1*a*** is preferably made of a transparent plastic. The plastic may be colored red. It can be made of PMMA (polymethyl methacrylate) or PC (polycarbonate), for example.

Figure 1:
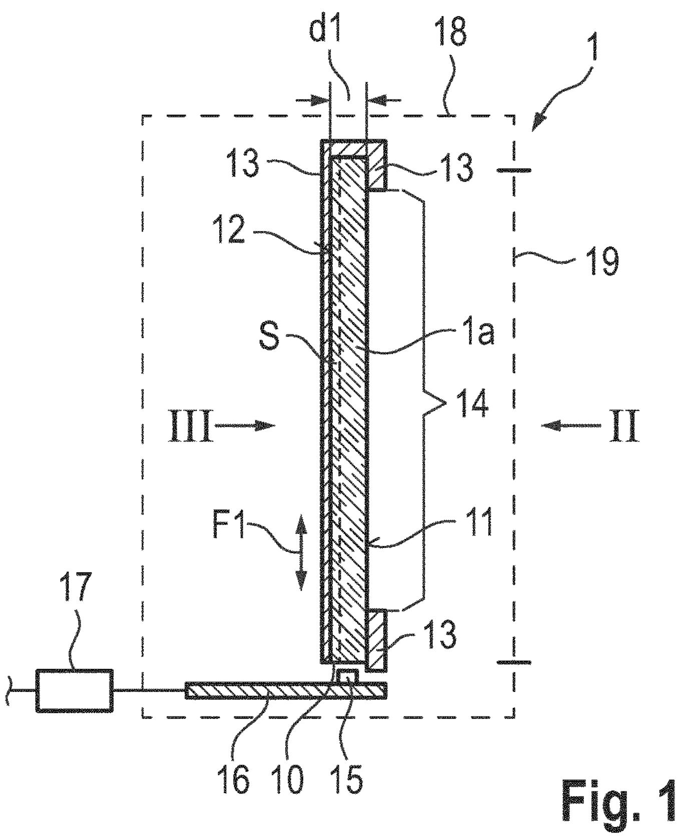
FIG. 1 is a lighting device in cross section, according to an example.

Light guide **1*a* is formed planar and therefore is a planar light guide. Light guide 1*a* therefore has a planar extent F1 that is several times greater than a thickness d1 of light guide 1*a*. Furthermore, it should also be noted that light guide 1*a* is flat. It is therefore not curved or bent when viewed in its cross section (cf. FIG. 1**)

As can be seen further from the figures, light guide **1*a* has a light incoupling surface 10, which is used to couple light from an illuminant 15. Light incoupling surface 10 is formed by a lower edge surface of light guide 1*a***.

In the example, there are multiple illuminants 15, which are preferably designed as light-emitting diodes (LEDs) and are mounted next to each other in a row on a circuit board 16.

Illuminants 15 can be individually controlled via a control unit 17. Control unit 17 can be part of lighting device 1. However, it is also conceivable that control unit 17 is present as a separate component. Control unit 17 can in turn be connected to a data bus (for example, a CAN bus) in terms of signaling. The signal connection of lighting device 1, for example, to the driver assistance systems of a motor vehicle can be realized in this way.

Light guide **1*a* has a rear surface 12, which is opposite a front light outcoupling surface 11**.

Furthermore, it is indicated by a dashed line in the figures that rear surface 12 or at least a majority of rear surface 12 is provided with a facet-like surface structure S, which serves as a light outcoupling structure and will be explained in more detail later.

Light guide 1*a* is surrounded by a frame-like panel 13. Frame-like panel 13 is designed light-tight and covers light guide 1*a* at the rear, on its laterally outer sides, and on its upper side. At the front, therefore, in the light emission direction LA, a window-like opening 14 is left free by frame-like panel 13.

Generated light rays from illuminants 15, which are coupled into light guide 1*a* at the edge via light incoupling surface 10, are deflected at the facet-like surface structure S in the direction of light outcoupling surface 11 and then emerge from light outcoupling surface 11 into the surroundings.

Figure 2:
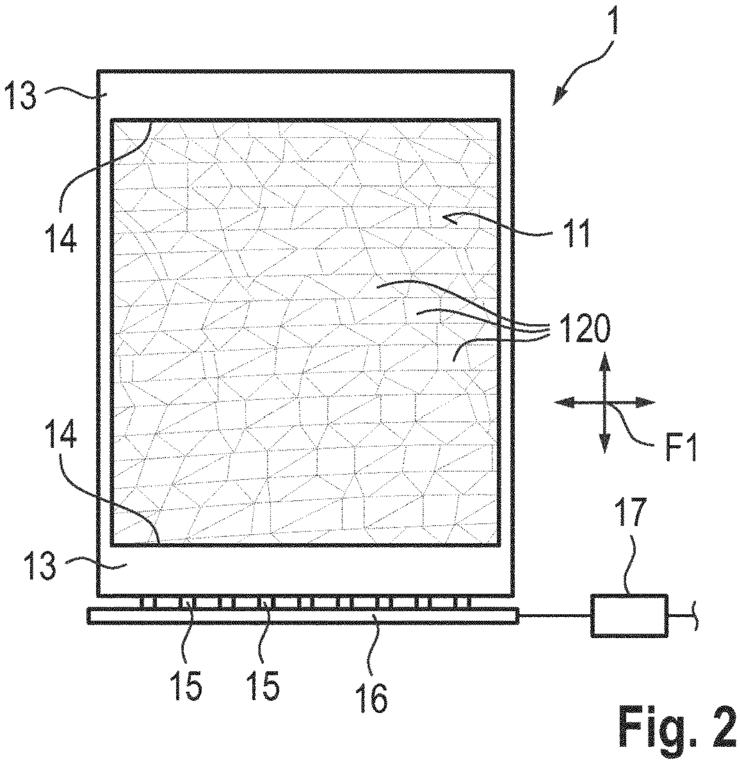
FIG. 2 is a depiction of the lighting device according to view II of FIG. 1 against the light emission direction.
Figure 3:
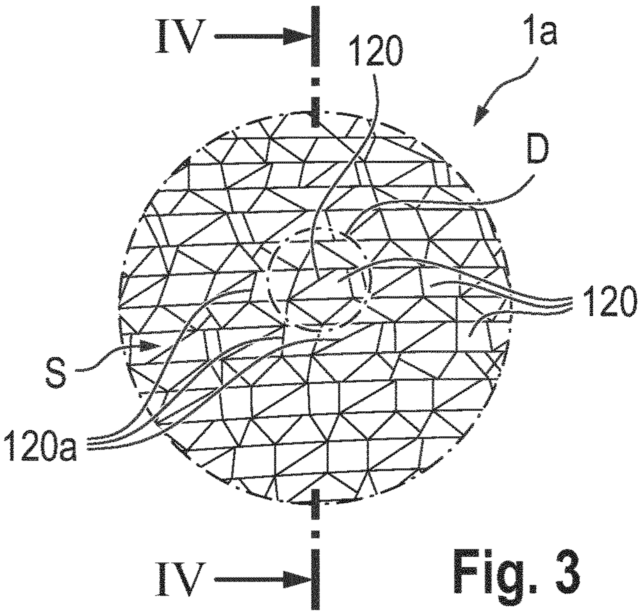
FIG. 3 is a view of a rear side of the lighting device according to view III of FIG. 1, but only partially and with the light guide exposed.

As can be seen in particular in FIGS. 2 and 3, the facet-like surface structure S is formed macroscopically and formed of a plurality of facet surfaces 120. Facet surfaces 120 are formed in particular by a combination of rectangular and/or triangular surfaces. Facet surfaces 120 can have different sizes. Preferably, facet surfaces 120 each have a longitudinal extent in a range of more than one millimeter in at least one spatial direction (spatial longitudinal direction X, spatial transverse direction Y, and/or spatial vertical direction Z). Particularly preferably, the longitudinal extent of each facet surface 120 in at least one spatial direction is in a range from about one millimeter to about ten millimeters. The individual facet surfaces 120 each have a microstructuring (will be explained later), wherein the normals of neighboring facet surfaces are oriented differently. Edges 120*a*, which have the smallest possible radius, are formed between adjacent facet surfaces 120. The orientation of the normals on one facet surface 120 differs from the orientation of the normals of all neighboring facet surfaces 120. A discontinuous deflection of the incoupled light rays falling on facet surfaces 120 and thus an intended sparkle effect are achieved hereby in a simple and cost-effective way. A sparkle effect occurs when a viewer changes from a first viewing position to a second viewing position.

However, it is also conceivable that a sparkle effect can be achieved if a viewer adopts a fixed viewing position looking at lighting device 1 opposite to the light emission direction LA. It is necessary for this that one or more of the illuminants 15 are activated in succession and thus switched on. For this purpose, control unit 17 can also contain a random generator with which one or more of the illuminants 15 can be randomly selected and activated.

It is possible that front light outcoupling surface 11 is provided with patterns or coatings to achieve additional lighting effects. The inner surfaces of the frame-like panel 13, said surfaces facing light guide 1*a*, can also be provided with coatings (preferably reflective).

Figure 4A:
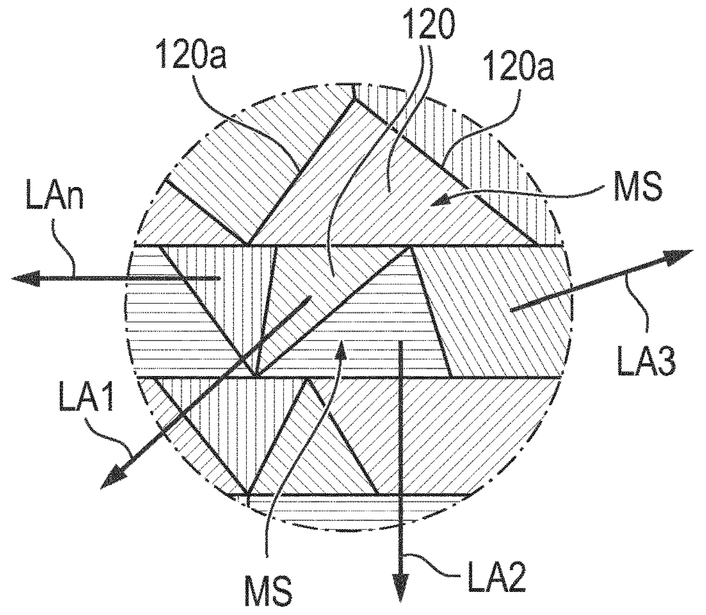

FIGS. 3, 4, and 4*a* show a detail section D of light guide 1*a* without frame-like panel 13 for a better representation.

It is particularly clear from FIGS. 4 and 4*a* that each of the facet surfaces 120 is in turn provided with a microstructuring MS. The microstructuring MS has in at least one spatial direction X, Y, Z a periodicity with a magnitude of preferably about 50 μm to about 500 μm, particularly preferably about 100 μm. In other words, the microstructuring MS in the example comprises a plurality of microstructures which have a sawtooth shape in cross section and which are repeated at least in one spatial direction X, Y, Z at a distance of about 50 μm to about 500 μm, particularly preferably of about 100 μm. In this regard, the microstructurings MS of neighboring facet surfaces 120 are oriented differently, so that again different light outcoupling directions LA1, LA2, LA3, . . . , LAn result (cf. FIG. 4*a*). The aforementioned sparkle effect can be optimized by the additional microstructuring MS.

Returning to FIG. 1, it is conceivable that light guide 1*a* can have an additional edge outcoupling element on one or more of its edge surfaces (for example, on the edge surface opposite light incoupling surface 10 at the edge). Such an edge outcoupling element can be arranged at least partially on an edge surface of light guide 1*a* and designed to additionally deflect light rays, coupled into light guide 1*a*, via light incoupling surface 10 in a predetermined angular range and to outcouple them again from light guide 1*a*. Preferably, such an additional edge outcoupling element is integrally connected to the respective edge surface. The predetermined angular range can include a surface normal of light outcoupling surface 11. In this case, the predetermined angular range can preferably lie in a cone with an opening angle of no more than 160° around the surface normal of light outcoupling surface 11. The cross section of such an edge outcoupling element can be designed triangular (in the form of a roof edge) and/or free-form.

Lighting device 1*a* can be supplemented in particular with directional light outcoupling with such an edge outcoupling element, which can increase the effectiveness of lighting device 1*a*.

A further example of a lighting device 2 is illustrated in FIGS. 5 and 6.

Lighting device 2 has a first light guide 1*a* and a second light guide 1*b*. First light guide 1*a* is designed in the same way as light guide 1*a* of the first example. In other words, it is also formed planar with a planar extent F1 and a thickness d1. Further, a rear surface 12 of light guide 1*a* is provided with a facet-like surface structure S (as already described).

Light guide 1*a* is in turn framed by a frame-like panel 13, which leaves open a window-like opening 14 of a light outcoupling surface 11*a* at the front.

Second light guide 1*b* is also formed planar, with a planar extent F2 and a thickness d2, wherein the planar extent F2 is several times greater than the thickness d2. The two light guides 1*a*, 1*b* are arranged with their planar extents F1, F2 at right angles to each other. The second light guide 1*b* is also made of a plastic (for example, PMMA or PC). The two light guides 1*a*, 1*b* can be connected to each other in one piece (materially bonded) using an injection molding process.

A circuit board 16, which carries illuminants 15*a* and 15*b*, is arranged below the light guide assembly formed of light guides 1*a* and 1*b*. Illuminants 15*a*, 15*b* are again preferably designed as LEDs. In this example, circuit board 16 therefore serves as a common circuit board for holding illuminants 15*a*, 15*b*.

In each case, multiple illuminants 15*b* arranged next to each other in a row are assigned to second light guide 1*b* and multiple illuminants 15*a* arranged next to each other in a row are assigned to first light guide 1*a*. In other words, light rays L2 from illuminants 15*b* are coupled into second light guide 1*b* via a first light incoupling surface 10*b*, deflected via a deflection slope 10*c*, and finally outcoupled via a light outcoupling surface 11*b* of second light guide 1*b* in the direction of a light emission direction LA of lighting device 2.

Light rays L1 from illuminants 15*a*, in contrast, are incoupled via a light incoupling surface 10*a* of second light guide 1*b*, perpendicular to a planar extent F2 of second light guide 1*b*, thus first entering second light guide 1*b*, passing through it, and then entering first light guide 1*a*. In this light guide, they are deflected in the direction of light outcoupling surface 11*a* with the aid of the facet-like surface structure S and outcoupled from it within window-like opening 14.

In the shown mounting position of lighting device 2, circuit board 16, which is jointly assigned to light guides 1*a*, 1*b*, is oriented horizontally with its planar extent F3. In this case, second light guide 1*b* is oriented with its planar extent F2 parallel to planar extent F3 of common circuit board 16. First light guide 1*a* is oriented with its planar extent F1 at a right angle to planar extent F3 of common circuit board 16.

The aforementioned components are in turn accommodated in a common housing 20. In the light emission direction LA, a light exit opening of housing 20 is closed by a lens 21. Lighting device 2 (like lighting device 1) is preferably designed as a rear light for a motor vehicle.

Further, it should be pointed out that light outcoupling surfaces 11*a* and 11*b* point in the same light emission direction LA or at least in sections in the same light emission direction LA. In other words, light outcoupling surfaces 11*a*, 11*b* of light guides 1*a*, 1*b* are oriented, at least in sections, such that their imaginary surface normals point in the same light ray direction LA.

It is clear from FIG. 6 that light guides 1*a* and 1*b* have the same or at least approximately the same width b. For the sake of clarity, housing 20 is no longer shown here.

It can be seen from this figure that, due to the planar design of second light guide 1*b* as well, its light outcoupling surface 11*b* is also designed strip-like or line-like.

Thus, for example, it is conceivable that the light function of a taillight is realized by illuminants 15*a* in conjunction with first light guide 1*a*. The light function of a brake light or a direction indicator as well can be realized by illuminants 15*b* in conjunction with second light guide 1*b*.

For this purpose, illuminants 15*a* and 15*b* can be suitably selected in terms of the type of light they emit. It is also conceivable to design illuminants 15*a*, 15*b* as so-called RGB light-emitting diodes. These are capable of emitting light in any color.

Deviating from the example, it is also conceivable to design second light guide 1*b* not planar but rod-shaped. The image as shown in FIG. 6 (light outcoupling surfaces 11*b*' are indicated by dashed lines) can then result with an exemplary use of multiple rod-shaped light guides 1*b*, each of which has a square light outcoupling surface 11*b*', for example.

Finally, a panel 22 should also be mentioned, into which second light guide 1*b* is introduced with its light outcoupling surface 11*b*.

Illuminants 15*a*, 15*b* are each arranged perpendicular to the plane of the drawing in a row, preferably along the entire or almost the entire width b of lighting device 2 (see FIGS. 5 and 6).

In this example as well, there is a control unit 17, which is connected to circuit board 16 in terms of signals. Illuminants 15*a* and 15*b* can be controlled separately from one another with the aid of control unit 17. In particular, illuminants 15*a* can be controlled individually or in groups independently of one another in such a way that a sparkle effect can also be created for an observer in a fixed viewing position.

Finally, a motor vehicle K is shown in a rear view in FIG. 7. The motor vehicle K is equipped with lighting devices 1 (or 2) of the invention, which in the present case are designed as rear lights.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting device for a motor vehicle, the lighting device comprising:

at least one light guide that is formed planar, the at least one light guide having a light incoupling surface, at least one light outcoupling surface and a rear surface that is opposite the at least one light outcoupling surface, the rear surface having at least one light outcoupling structure; and at least one illuminant, wherein light rays from the at least one illuminant are coupled into the at least one light guide via the light incoupling surface of to the at least one light guide, wherein incoupled light rays are deflected via the at least one light outcoupling structure of the at least one light guide in a direction of the at least one light outcoupling surface of the at least one light guide and are outcoupled from the at least one light guide via the at least one light outcoupling surface, wherein a majority of a planar extent of the rear surface of the at least one light guide is provided with a facet surface structure which forms the at least one light outcoupling structure of the at least one light guide, the facet surface structure being formed of a plurality of irregularly formed facet surfaces, the facet surfaces being irregularly formed such that surface normals of adjacent facet surfaces are oriented differently from each other, and wherein each respective facet surface of the facet surfaces is provided with a microstructuring, the microstructuring having a repeating pattern of microstructures.

2. The lighting device according to claim 1, wherein the facet surface structure is a macrostructuring.

3. The lighting device according to claim 1, wherein the microstructuring has a periodicity in a range from 50 μm to 500 μm in at least one spatial direction.

4. The lighting device according to claim 1, wherein the at least one illuminant includes a plurality of illuminants and the light device further comprises at least one control unit for controlling the plurality of illuminants, wherein the plurality of illuminants are controlled independently of one another, and wherein the plurality of illuminants are controlled and are arranged relative to positions and/or orientations of the facet surfaces in such a way that at least one light function with a perceptible sparkle is produced in a specific viewing position by the light rays emitted by the plurality of illuminants and deflected at the at least one light outcoupling structure.

5. The lighting device according to claim 1, wherein the at least one light guide is flat.

6. A motor vehicle comprising at least one lighting device according to claim 1.

7. The lighting device according to claim 1, wherein the lighting device is a rear light of the motor vehicle.

8. The lighting device according to claim 1, wherein the microstructuring on each respective facet surface of the facet surfaces includes triangular shaped structures when viewed in cross section.

9. A lighting device for a motor vehicle, the lighting device comprising:

at least one light guide that is formed planar, the at least one light guide having a light incoupling surface, at least one light outcoupling surface and a rear surface that is opposite the at least one light outcoupling surface, the rear surface having at least one light outcoupling structure; and at least one illuminant, wherein light rays from the at least one illuminant are coupled into the at least one light guide via the light incoupling surface of to the at least one light guide, wherein incoupled light rays are deflected via the at least one light outcoupling structure of the at least one light guide in a direction of the at least one light outcoupling surface of the at least one light guide and are outcoupled from the at least one light guide via the at least one light outcoupling surface, wherein a majority of a planar extent of the rear surface of the at least one light guide is provided with a facet surface structure which forms the at least one light outcoupling structure of the at least one light guide, the facet surface structure being formed of a plurality of irregularly formed facet surfaces, and wherein there is at least one second light guide, into which light rays from at least one second illuminant are coupled via a light incoupling surface assigned to the at least one second light guide and are outcoupled from the at least one second light guide via at least one light outcoupling surface of the at least one second light guide, wherein the at least one illuminant of the at least one light guide and the at least one second illuminant of the at least one second light guide are arranged on a common circuit board and the at least one light outcoupling surface of the at least one light guide and the at least one light outcoupling surface of the at least one second light guide point, at least in sections, in a same light emission direction.

10. The lighting device according to claim 9, wherein the at least one second light guide is formed planar, wherein one edge side of the at least one second light guide serves as the light incoupling surface and another edge side of the at least one second light guide serves as the at least one light outcoupling surface.

11. The lighting device according to claim 9, wherein the at least one second light guide is designed rod-shaped, wherein one end face of the at least one second light guide serves as the light incoupling surface and another end face of the at least one second light guide serves as the at least one light outcoupling surface.

12. The lighting device according to claim 9, wherein a planar extent of the at least one light guide is oriented perpendicular to a planar extent of the common circuit board and a planar extent of the at least one second light guide is oriented parallel to the planar extent of the common circuit board, wherein the at least one second light guide has a deflection slope arranged in a region of the light incoupling surface of the at least one second light guide.

* * * * *